(12) United States Patent  
Barber et al.

(10) Patent No.: US 8,581,748 B1  
(45) Date of Patent: Nov. 12, 2013

(54) SYSTEM, DEVICE, AND METHOD FOR GENERATING AN ILS-BASED HIGHWAY-IN-THE-SKY

(75) Inventors: Sarah Barber, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 240 days.

(21) Appl. No.: 13/236,735

(22) Filed: Sep. 20, 2011

(51) Int. Cl.  
*G01C 21/00* (2006.01)

(52) U.S. Cl.  
USPC ........................................................ 340/971

(58) Field of Classification Search  
USPC .............. 340/971, 947, 951, 976; 701/14, 17, 701/467  
See application file for complete search history.

(56) References Cited

U.S. PATENT DOCUMENTS

| | | | | |
|---|---|---|---|---|
| 7,209,053 B2 * | 4/2007 | Gannon | ........................ | 340/972 |
| 7,869,943 B1 * | 1/2011 | Simon | ........................... | 701/436 |
| 2009/0312893 A1 * | 12/2009 | Dwyer et al. | .................... | 701/14 |
| 2012/0022727 A1 * | 1/2012 | Flanigan et al. | ................. | 701/16 |
| 2013/0046462 A1 * | 2/2013 | Feyereisen et al. | ........... | 701/457 |

\* cited by examiner

*Primary Examiner* — Phung Nguyen (74) *Attorney, Agent, or Firm* — Donna P. Suchy; Daniel M. Barbieri (57) ABSTRACT

A present novel and non-trivial system, device, and method are disclosed for generating an ILS-based highway-in-the-sky ("HITS"). The system is comprised of an image data generator configured to receive navigation data, ILS deviation data, and navigation reference data from applicable data sources, where the navigation data is representative of ownship position, the ILS deviation data is representative of localizer and glide slope deviation, and navigation reference data is representative of data corresponding to an ILS approach of a runway; determine two instantaneous waypoints as a function of the received data; generate image data representative of a HITS, where the proximal and distal ends of the HITS are based upon the two instantaneous waypoints; and provide the image data to a display unit, whereby the HITS is presented on the screen of a display unit.

21 Claims, 9 Drawing Sheets

SYSTEM, DEVICE, AND METHOD FOR GENERATING AN ILS-BASED HIGHWAY-IN-THE-SKY

BACKGROUND OF THE INVENTION

1. Field of the Invention

This invention pertains generally to the field of cockpit indicators or display units that provide flight information to the pilot or flight crew of an aircraft, and more particularly to synthetic vision systems.

2. Description of the Related Art

Synthetic Vision Systems (singularly, "SVS") have been operating for a few years now in a wide range of aircraft; from small, General Aviation airplanes, right up to long range corporate jets; however, these systems are approved or certified for situational awareness only, with the aim of increasing flight safety by providing the flight crew with a real-time, intuitive representation of the external environment. The synthetic scene is rendered from the pilot's eye viewpoint, and typically contains the following: terrain, obstacles, rivers and lakes, and the environment of airports. While certainly enhancing the flight crew's awareness of where they are in space, and where they are relative to terrain, obstacles and the airport, the system cannot currently be used for any operational credit. That is to say there is no difference in operational capabilities between an airplane with an SVS and one without.

With the availability of navigation data provided by satellite navigation systems such as the well-known global positioning system ("GPS") and publicly-accessible terrain data, synthetic images indicative of the scene outside the aircraft and presented to the pilot on the display unit have proliferated. When waypoint data representative of a flight plan is included in the generating of the synthetic image, it has been possible to display a highway-in-the-sky ("HITS") upon which the pilot may operate his or her aircraft. The HITS may overlay a background comprised of a synthetic scene depicting sky and ground, where the generation of image data representative of the synthetic scene could have been based upon navigation data such as GPS data. If there are no errors in the navigation data, the synthetic scene will be in conformance with the actual scene outside the aircraft that is viewed by the pilot. If the aircraft is properly aligned with a runway when approaching to land, the HITS will indicate the proper alignment, and the landing area of the runway will be seen. Where the HITS is depicted as a tunnel or tunnel-like, the landing area of the runway will be seen through the tunnel and beyond the tunnel exit. By being able to see the landing area on the other side of the HITS (i.e., the landing area is not blocked from the pilot's view by the HITS or the HITS does not obstruct the pilot's view of the landing area), the pilot is provided with a visual cue that there may be no errors in the navigation data.

If there are errors in the navigation data, the synthetic scene will not be in conformance with the actual scene outside the aircraft that is viewed by the pilot. While a non-conformal synthetic scene may be noticeable to a pilot who, while flying an ILS approach in visual meteorological conditions, has the actual runway landing environment in sight, it may not be noticeable to a pilot who is operating the aircraft in instrument meteorological conditions ("IMC"). When IMC conditions exist, the pilot may not have a visual cue that errors may exist in navigation data. If the generation of the HITS is based upon erroneous navigation data, the pilot may still not have a visual cue that there may be errors in the navigation data because both the synthetic scene and the HITS are based on the same erroneous navigation data. Although the HITS may provide the pilot with an unobstructed view of the landing area and provide the pilot with a visual cue that the aircraft is properly aligned for landing, an aircraft that is actually below the actual glide slope may end up short of the landing area or an aircraft that is actually above the actual glide slope may end up long of the landing area if HITS is relied upon to complete the approach to the runway. Both of these scenarios present unwelcome and potentially hazardous flying conditions because of the erroneous navigation data.

BRIEF SUMMARY OF THE INVENTION

The embodiments disclosed herein present a novel and non-trivial system, device, and method for generating an ILS-based HITS that is presented on a display unit of an aircraft. When presented on the surface of the display unit, the HITS may provide the pilot with a visual cue regarding the reliability of the navigation data.

In one embodiment, a system for generating an ILS-based HITS is disclosed. The system may be comprised of a navigation data source, an ILS deviation data source, a navigation reference data source, image data generator ("IDG") configured to perform the method disclosed below to generate two real-time, instantaneous waypoints, and a display system comprised of one or more display units for presenting the HITS against the background of a synthetic scene indicative of the scene outside the aircraft. One instantaneous waypoint may be used to generate the proximal end of the HITS (e.g., a HITS tunnel entry point), and the other instantaneous waypoint may be used to generate the distal end of the HITS (e.g., a HITS tunnel exit point). The location of the distal end of the HITS in relation to the landing area of a runway may provide the pilot with a visual cue of whether the navigation data provided by a navigation data source contains errors.

In another embodiment, a device is disclosed for generating an ILS-based HITS. The device is the IDG configured to perform the method disclosed in the following paragraph. The device could include input and output interfaces to facilitate the receiving of navigation data, ILS-deviation data, and navigation reference data and providing of image data generated as a function of the received data to the display system. The IDG and the input and output interfaces could be part of a printed circuit board.

In another embodiment, a method is disclosed for generating an ILS-based HITS, where the method may be performed by the IDG. When configured to perform the method, the IDG may receive the navigation data, the ILS-deviation data, and the navigation reference data; determine instantaneous waypoint data representative of two real-time, instantaneous waypoints; generate image data representative of a HITS, where the proximal end of the HITS is based upon one waypoint and the distal end is based upon the other waypoint; and provide the image data to the display system, whereby the HITS represented in the image data is presented on the surface of one or more display units. The HITS may be presented against the background of a synthetic vision image of a three-dimensional perspective indicative of the scene outside the aircraft (i.e., ownship).

BRIEF DESCRIPTION OF THE DRAWINGS

The drawings of FIG. 3 depict an ILS-based HITS providing visual cues of erroneous navigation data upon which the synthetic scene has been generated.

The drawings of FIG. 4 provide a flowchart illustrating a method for generating an ILS-based HITS.

The drawings of FIG. 5 depict the variables used in determining the ILS-based HITS.

DETAILED DESCRIPTION OF THE INVENTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
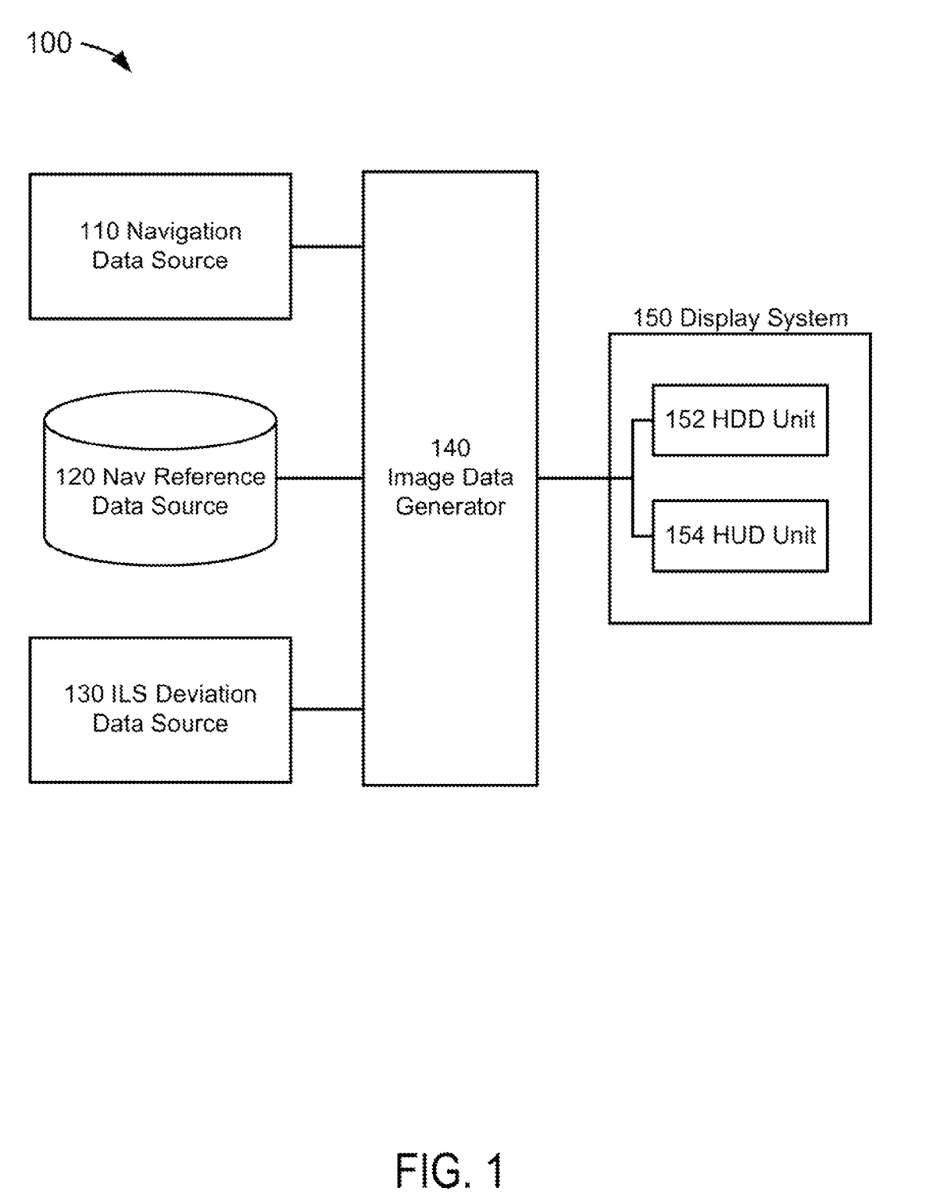
FIG. 1 depicts a block diagram of an ILS-based HITS generating system.

FIG. 1 depicts a block diagram of a highway-in-the-sky ("HITS") generating system 100 suitable for implementation of the techniques described herein. The HITS generating system 100 of an embodiment of FIG. 1 includes a navigation data source 110, a navigation reference data source 120, an instrument landing system ("ILS") deviation data source 130, an image data generator ("IDG") 140, and a display system 150.

In an embodiment of FIG. 1, the navigation data source 110 could be comprised of any source(s) which provides data representative of ownship information, where such information could be comprised of, but not limited to, horizontal position, vertical position, pressure altitude, horizontal velocity (e.g., ground speed), vertical velocity, horizontal position accuracy, vertical position accuracy, horizontal velocity accuracy, vertical velocity accuracy, ground track, and/or ownship intended flight path information. One navigation data source 110 for providing ownship information data could be a navigation system found in an aircraft. It should be noted that data, as embodied herein for any source or system in an aircraft including the navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation system may include, but is not limited to, an air/data system, an attitude heading reference system, an inertial guidance system (or inertial reference system), a global navigation satellite system (or satellite navigation system), and/or a flight management system ("FMS") (which is comprised of, in part, a database), all of which are known to those skilled in the art. As embodied herein, the navigation data source 110 may provide ownship information data to the IDG 140 for subsequent processing as discussed herein.

In an embodiment of FIG. 1, the navigation reference data source 120 could be any database which could store data associated with ground-based navigational aids such as the instrument landing system ("ILS"), waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, and path point records. Although not limiting to the embodiments disclosed herein, the navigation reference data source 120 could be a database designed to meet the standards published by Aeronautical Radio, Incorporated ("ARINC") in the following document: ARINC Specification 424-18 entitled "Navigations Systems Data Base" ("ARINC 424"), an aviation industry standard known to those skilled in the art.

In an embodiment of FIG. 1, the ILS deviation data source 130 could be any device known to those skilled in the art for measuring the angular deviation between an aircraft and a desired course to a runway and a desired glide slope, where the desired course to the runway may coincide with a runway alignment axis. The ILS deviation data source 130 could be an ILS receiver installed in an aircraft that is linked to a localizer antenna and a glide slope antenna. The ILS receiver could be configured for receiving and demodulating localizer and glide slope signals propagated by ground-based localizer and glide slope transmitters. After the signals have been demodulated, ILS receiver data representative of, in part, angular localizer and glide slope deviation information may be generated by the ILS receiver and provided to the IDG 140.

In an embodiment of FIG. 1, the IDG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IDG 140 may be driven by the execution of software or computer instruction code containing algorithms developed for the specific functions embodied herein. The IDG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. The IDG 140 could be a processor(s) used by or in conjunction with any other system of the aircraft including, but not limited to, the navigation data source 110, the navigation reference data source 120, the ILS deviation data source 130, and the display system 150, or any combination thereof.

The IDG 140 may be programmed or configured to receive as input data representative of information obtained from various systems and/or sources including, but not limited to, the navigation data source 110 and the navigation reference data source 120. As embodied herein, the terms "programmed" and "configured" are synonymous. The IDG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The IDG 140 may be programmed or configured to execute one or both of the methods discussed in detail below. The IDG 140 may be programmed or configured to provide image data representative of a HITS to the display system 150.

In an embodiment of FIG. 1, the display system 150 may include, but is not limited to, one or more tactical display unit(s) comprising a Head-Down Display ("HDD") unit 152 and/or a Head-Up Display ("HUD") unit 154. The HDD unit 152 and/or the HUD unit 154 may display an image from data produced by one or more vision systems such as, but not limited to, a synthetic vision system ("SVS"), an enhanced vision system ("EVS"), or a combined SVS-EVS. The HDD unit 152 is typically a unit mounted to an aircraft's flight instrument panel located in front of a pilot and below the windshield and the pilot's field of vision, and the HUD unit 154 provides tactical information to the pilot or flight crew, in the pilot's forward field of view through the windshield, eliminating transitions between head-down and head-up flying.

Figure 2A:
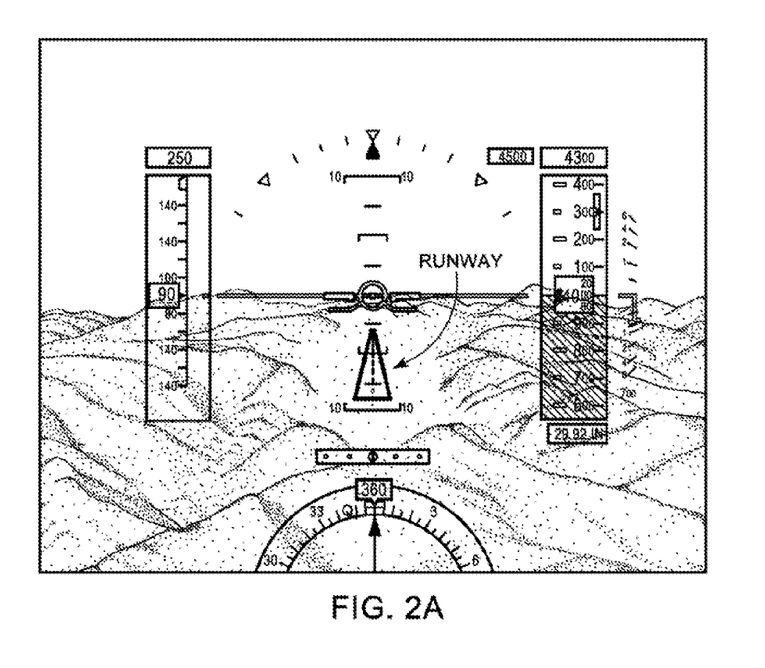
FIG. 2A depicts tactical flight symbology against a synthetic image indicative of the scene outside the aircraft.
Figure 2B:
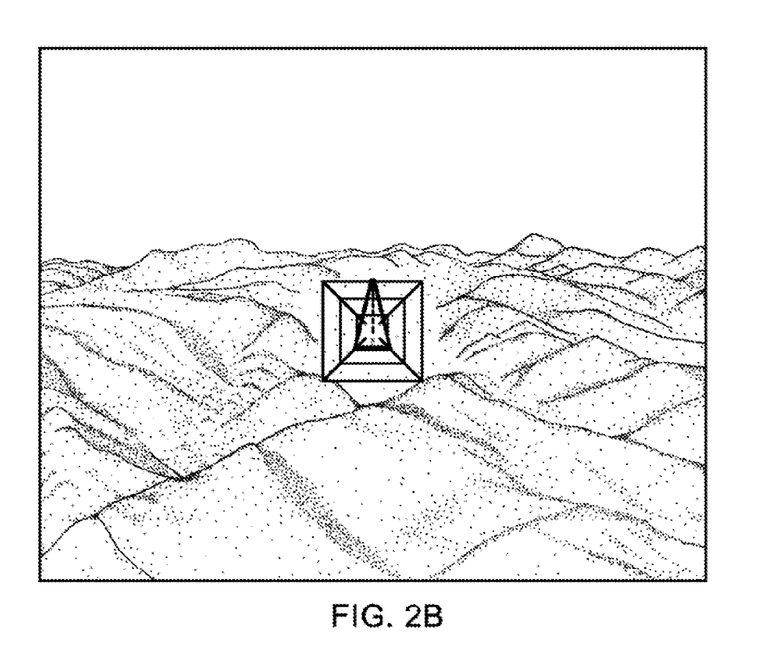
FIG. 2B depicts a HITS against a synthetic image indicative of the scene outside the aircraft.

The drawings of FIG. 2 depict exemplary illustrations of a synthetic image of the scene outside the aircraft presented on the surface of a tactical display unit with symbology providing tactical flight information, where the scene includes a runway; for the purpose of discussion herein, the scene depicts an aircraft located on a final approach to the runway. The tactical display unit as embodied herein includes any HDD unit 152 and/or a HUD unit 154 that could present or depict a synthetic and/or enhanced sky/terrain artificial horizon generated by vision systems including, but not limited to, an SVS, an EVS, and/or a combined SVS-EVS. Although the discussion herein will be drawn to illustrations using a tactical display unit resembling a Primary Flight Display ("PFD"), the embodiments herein are not limited solely to PFDs but include any display unit of the display system 150 that could provide tactical flight information.

As embodied herein, tactical flight information displayed on a tactical display unit could be information relevant to the instant or immediate control of the aircraft, whether the aircraft is in flight or on the ground. As shown in FIG. 2A, the tactical flight information displayed is the tactical flight symbology, such as "basic T" information (i.e., airspeed, attitude, altitude, and heading). This displayed symbology is known to those skilled in the art.

As shown in FIG. 2B, the tactical flight symbology has been replaced with the symbology indicative of a HITS. It should be noted that, although the tactical flight symbology and the HITS may be generated simultaneously with each other, they are being addressed separately herein for the purpose of discussion and illustration only. A HITS could provide course guidance to the pilot using a perspective view of a path through the air. A HITS may be configured for more than one type of design. As illustrated in FIG. 2B, the HITS has been configured as three sequentially-connected rectangles (specifically, squares) for depicting a flight pathway or tunnel, and it appears to narrow or taper as the squares appear to become smaller, thereby providing the appearance of flight into a tunnel. As embodied herein, the largest square may represent a proximal end of a HITS closest to the aircraft (i.e., the entrance into the tunnel), and the smallest square may represent a distal end of a HITS farthest from the aircraft (i.e., the exit from the tunnel). For the purposes of the examples of the HITS provided herein, the longitudinal distance between successive squares will be assumed to be 2 NM per square; that is, the longitudinal scale of the HITS will be assumed to be 2 NM per square although a manufacturer or end-user may configure the distance to be different than this example. As such, the use of three squares representing the HITS will create an assumed HITS projection of 4 NM outwardly from the aircraft and/or into the scene.

A plurality of HITS depictions is available or configurable to a manufacturer or end-user. Those skilled in the art will appreciate the ability and ease with which executable software code may be reprogrammed or modified by a manufacturer or end-user to facilitate a configuration of a HITS depiction selected by a manufacturer or end-user without affecting or expanding the scope of the embodiments discussed herein. The illustrations of the HITS presented herein are intended to provide examples of a HITS, and are not intended to provide a limitation or an exhaustive list of the embodiments discussed herein.

The HITS shown in FIG. 2B overlays a background comprised of a synthetic scene depicting sky and ground, where the generation of image data representative of the synthetic scene could have been based upon navigation data provided by the navigation system data source 110. If there are no errors in the navigation data, the synthetic scene will be in conformance with the actual scene outside the aircraft that is viewed by the pilot. If the aircraft is properly aligned for landing, the HITS tunnel will indicate the proper alignment, and the landing area of the runway will be seen through the \ tunnel and beyond the tunnel exit. As shown in FIG. 2B, the landing area of the runway is seen through the tunnel and beyond the tunnel exit. By being able to see the landing area on the other side of the HITS (i.e., the landing area is not blocked from the pilot's view by the HITS or the HITS does not obstruct the pilot's view of the landing area), the pilot is provided with a visual cue that there may be no errors in the navigation data.

If there are errors in the navigation data, the synthetic scene will not be in conformance with the actual scene outside the aircraft that is viewed by the pilot. While a non-conformal synthetic scene may be noticeable to a pilot who, while flying an ILS approach in visual meteorological conditions, has the actual runway landing environment in sight, it may not be noticeable to a pilot who is operating the aircraft in instrument meteorological conditions ("IMC"). When IMC conditions exist, the pilot may not have a visual cue that errors may exist in navigation data. If the generation of the HITS is based upon erroneous navigation data, the pilot may still not have a visual cue that there may be errors in the navigation data because both the synthetic scene and the HITS are based on the same erroneous navigation data. Although the HITS may provide the pilot with an unobstructed view of the landing area and provide the pilot with a visual cue that the aircraft is properly aligned for landing, an aircraft that is actually below the actual glide slope may end up short of the landing area or an aircraft that is actually above the actual glide slope may end up long of the landing area if HITS is relied upon to complete the approach to the runway.

Figure 3A:
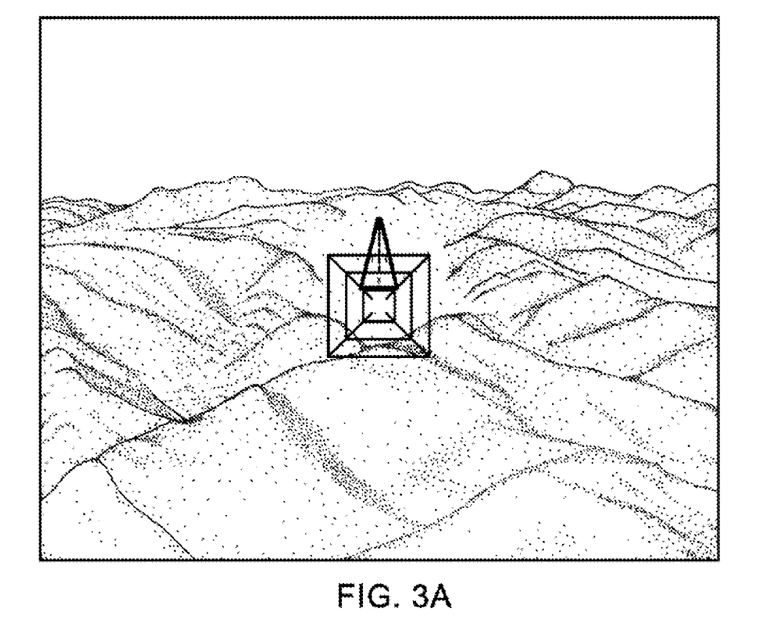
Figure 3B:
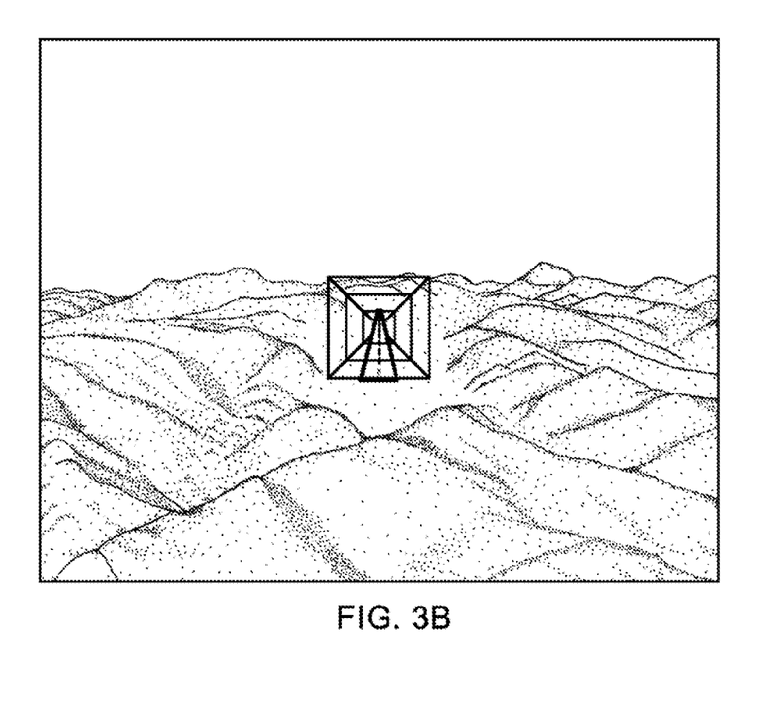

The advantages and benefits of the embodiments discussed herein could provide the pilot with a visual cue of errors in the navigation data by presenting an ILS-based HITS on the tactical display unit against the background of the synthetic scene. In the embodiments of each of the drawings of FIG. 3, the ILS-based HITS provides visual cues of erroneous navigation data because the landing area of the runway is not seen through the tunnel; that is, the HITS obstructs the pilot's view of the landing area.

As shown in FIG. 3A, the distal end of the ILS-based HITS is depicted below the landing area of the runway, thereby cueing the pilot that the aircraft is actually higher than the altitude represented in the navigation data. As shown in FIG. 3B, the distal end of the ILS-based HITS is depicted above the landing area of the runway, thereby cueing the pilot that the aircraft is actually lower than the altitude represented in the navigation data.

Figure 4A:
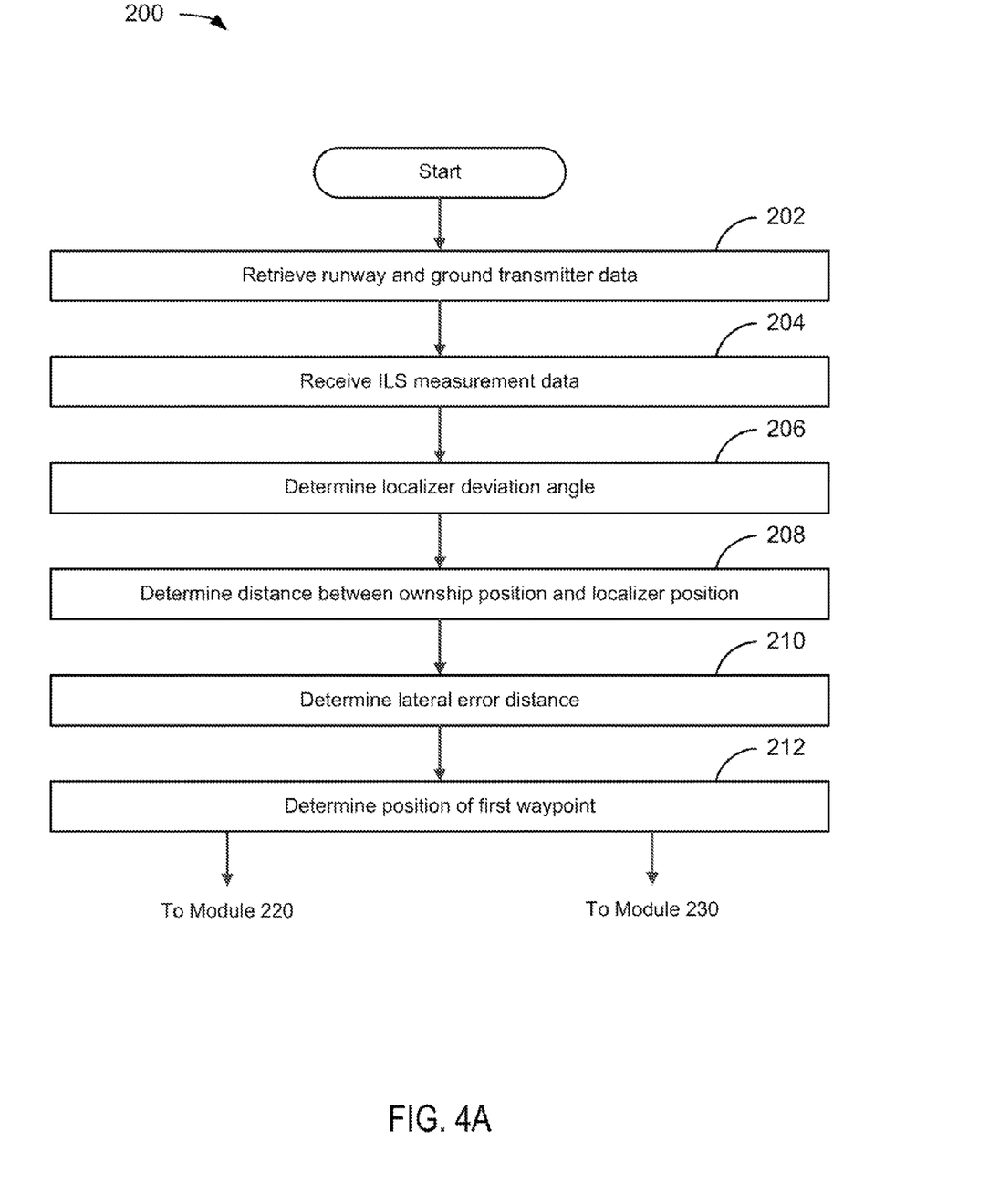
Figure 4B:
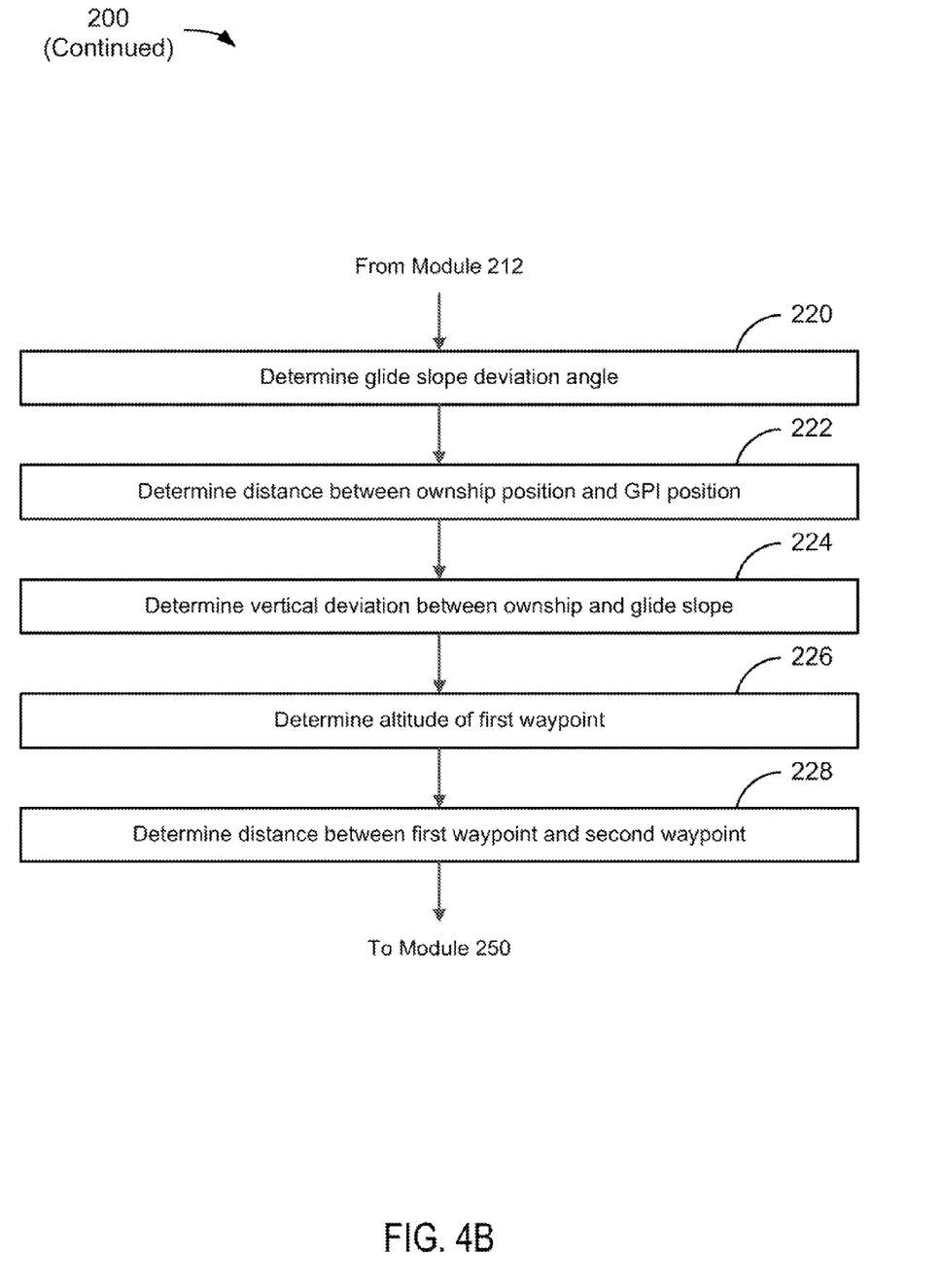
Figure 4C:
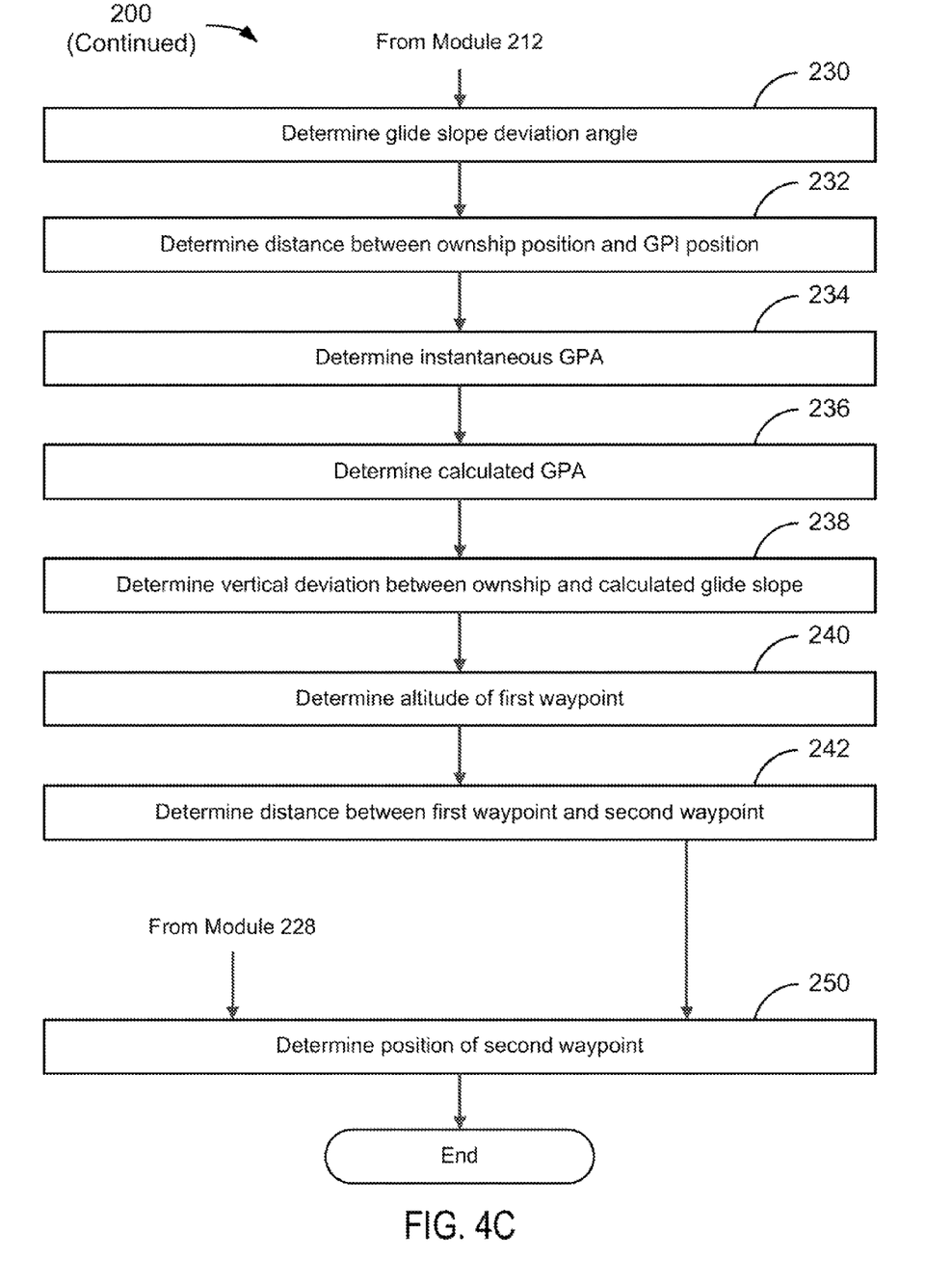

The drawings of FIG. 4 depict a flowchart 200 of an example of a method for generating a HITS image based on deviation information provided by an ILS, where the IDG 140 may be programmed or configured with instructions corresponding to the following modules. As necessary for the accomplishment of the following modules embodied in FIG. 4, the receiving of data is synonymous and/or interchangeable with the retrieving of data. As stated above, data and signals are treated synonymously.

Flowchart 200 discloses an example of a method for generating instantaneous waypoints WP1 and WP2 based upon real-time inputs received by the ILS deviation data source 130 installed in an aircraft, where such waypoints may be used in the generation of HITS entry and exit points. Although the modules of the flowchart are presented in the drawings of FIG. 4, the drawings of FIG. 5 will be referenced during the discussion of the flowchart.

Figure 5A:
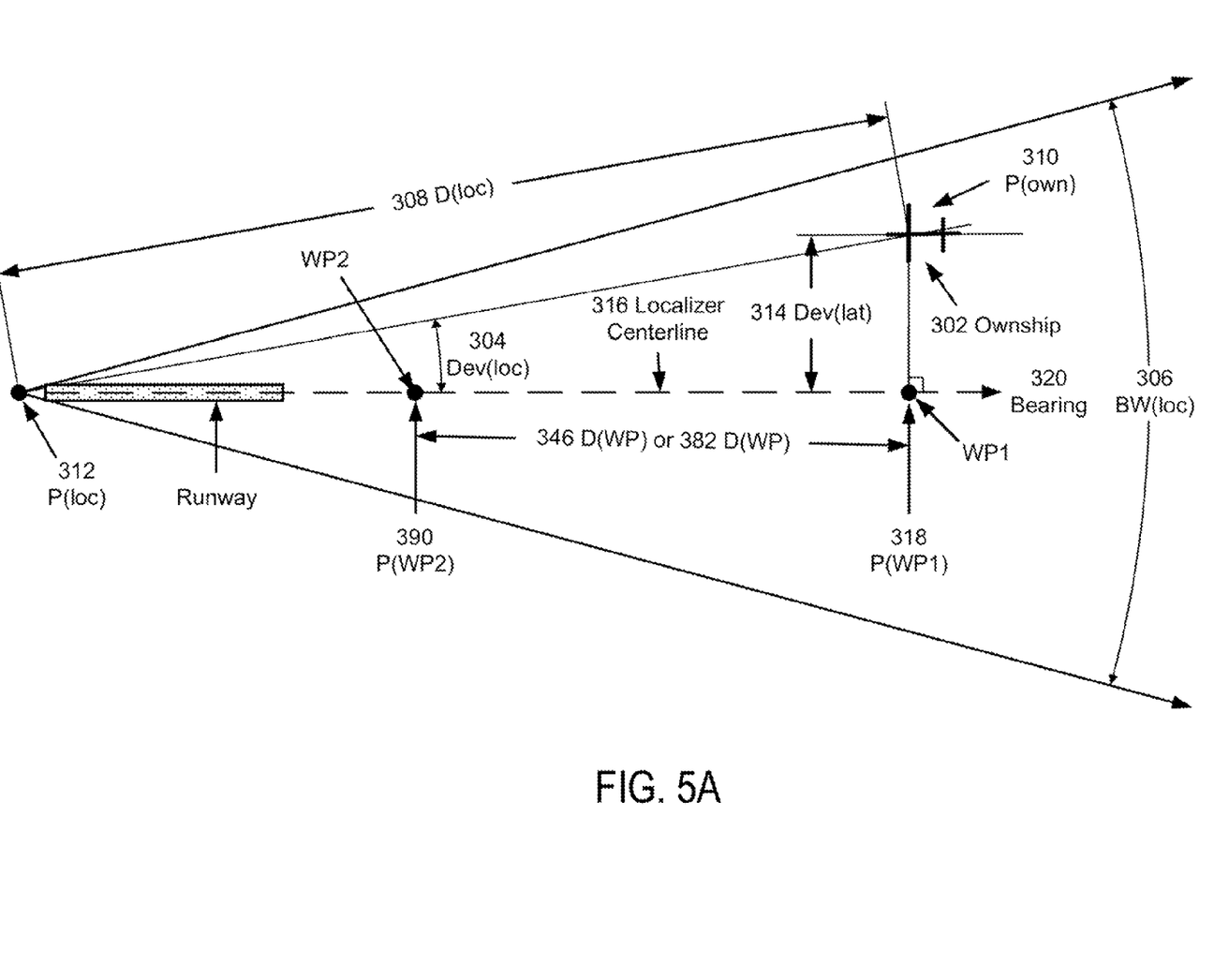

Referring to FIG. 5A, the flowchart begins with module 202 with the retrieving of runway and ILS ground transmitters data from the airport surface data source 120. The flowchart continues with module 204 with the receiving of ILS measurement data from the ILS deviation data source 130 installed in ownship 302.

The flowchart continues with module 206 with the determining of localizer deviation angle dev(loc) 304 as a function of ILS deviation data and runway and ILS ground transmitters data. Using ILS measurement data representative of a lateral measurement and localizer beam width BW(loc) 306, dev (loc) 304 may be determined.

The flowchart continues with module 208 with the determining of a distance D(loc) 308 between the ownship position P(own) 310 and the localizer position P(loc) 312 as a function of navigation data and runway and ILS ground transmitters data. In one embodiment, P(loc) 312 could be represented by the latitude/longitude information of the localizer transmitter. In another embodiment, P(loc) 312 may be determined from other runway and ILS ground transmitters data. For example, P(loc) 312 may be determined from data representative of information corresponding to the landing threshold position, the runway length, the information corresponding to the localizer position from the end of the runway, and the localizer bearing data of the localizer course.

The flowchart continues with module 210 with the determining of a lateral error distance Dev(lat) 314 between the P(own) 310 and the localizer centerline 316 as a function of Dev(loc) 304 and D(loc) 308. For example, Dev(lat) 314 could be determined as the product of D(loc) 308 and the sine of Dev(loc) 304.

The flowchart continues with module 212 with the determining of a position P(WP1) 318 of the first instantaneous waypoint WP1 as a function of P(own) 310, Dev(lat) 314, and bearing 320 of the localizer course of the localizer centerline 316. For example, P(WP1) 318 may be a point determined as an offset from P(own) 310 by the distance Dev(lat) 314 in a direction that is perpendicular the localizer centerline 316.

The flowchart continues with either module 220 or module 230, where module 220 initiates a first sequence of actions and module 230 initiates a second sequence of actions. Each sequence is used to determine the altitude of WP1, the position and altitude of WP2, and the distance between them.

Figure 5B:
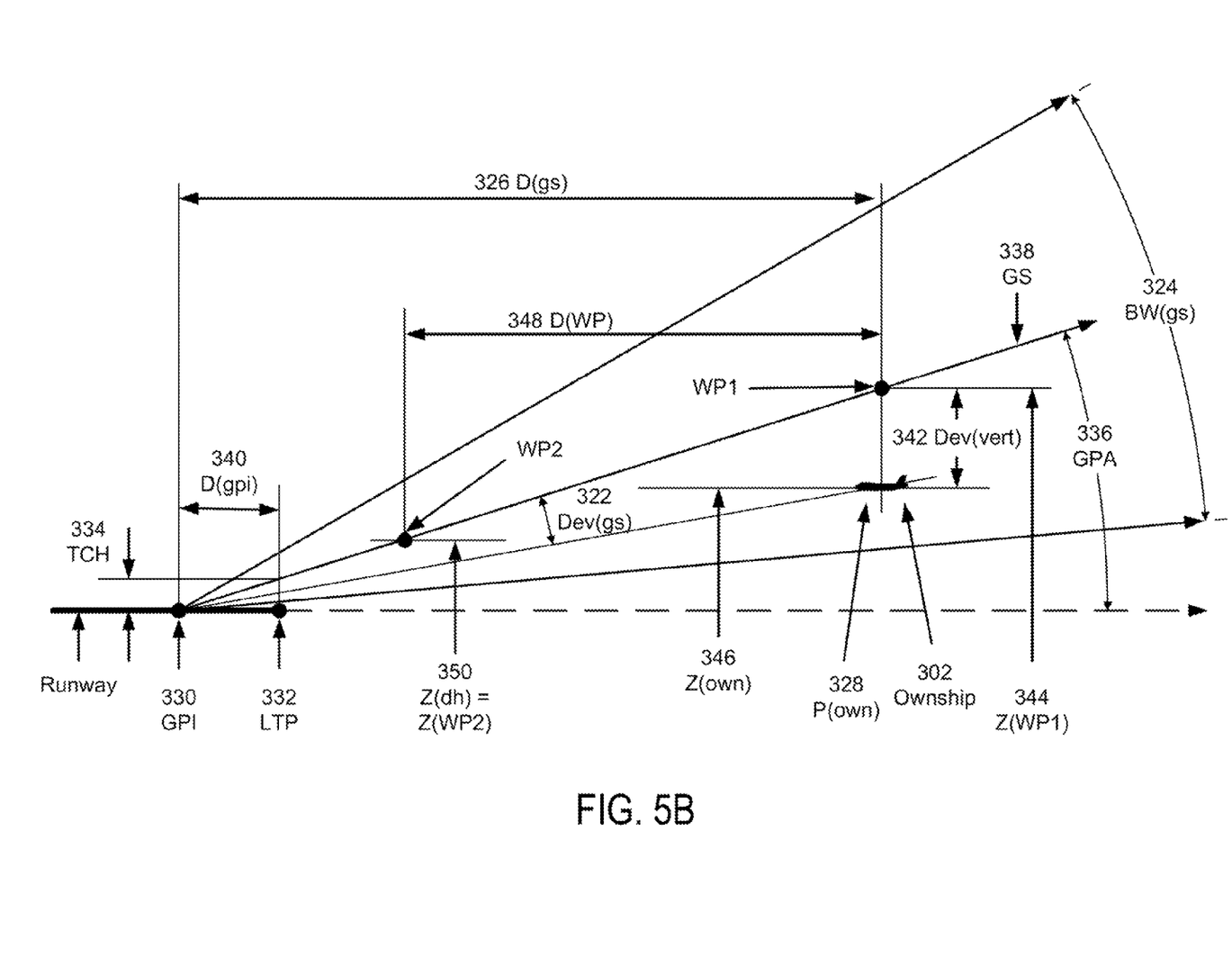

To initiate the first sequence of actions and referring to FIG. 5B, the flowchart proceeds from module 212 to module 220 with the determining of glide slope deviation angle Dev(gs) 322 of ownship 302 as a function of ILS measurement data and runway and ILS ground transmitters data. Using ILS deviation data representative of a glide slope measurement and glide slope beam width BW(loc) 324, Dev(gs) 322 may be determined.

The flowchart continues with module 222 with the determining of a distance D(gs) 326 between the P(own) 328 and the position of a ground point intercept GPI 330 as a function of navigation data and runway and ILS ground transmitters data. In one embodiment, GPI 330 could be represented by the latitude/longitude information of the glide slope transmitter. In another embodiment, GPI 330 may be determined from other runway and ILS ground transmitters data. In one example, GPI 330 may be determined from data representative of information corresponding to the landing threshold position LTP 332, threshold crossing height TCH 334, glide path angle GPA 336 of the glide slope 338, and the direction of the runway. The distance D(gpi) 340 between the GPI 330 and the LTP 332 can be determined as the quotient of the TCH 334 divided by the tangent of the GPA 336; then, the GPI 330 could be determined by applying D(gpi) 340 as an offset from the LTP 332 in the direction of the runway.

The flowchart continues with module 224 with the determining of a vertical deviation Dev(vert) 342 between ownship 302 and GS 338 as a function of Dev(gs) 322, D(gs) 326, and GPA 336. For example, D(vert) 342 could be the difference between two products—the product of D(gs) 326 and the tangent of GPA 336 and the product of D(gs) 326 and the tangent of the angle formed by the difference between GPA 336 and Dev(gs) 322.

The flowchart continues with module 226 with the determining of a altitude Z(WP1) 344 of WP1 as a function of D(vert) 342 and the altitude of ownship Z(own) 346. Z(WP1) 344 may be a point determined by a sum of D(vert) 342 and Z(own) 346. The flowchart continues with module 228 with the determination of the distance D(WP) 348 of WP2 as a function of GPA 336, Z(WP1) 344, and the altitude Z(dh) 350 of the decision height (which is equal to the altitude Z(WP2) of WP2), where the decision height has been received as input from the navigation system. For example, D(WP) 348 could be the quotient of the difference between Z(WP1) 344 and Z(dh) 350 divided by the tangent of GPA 336. Then, the first sequence of actions ends and the flowchart proceeds to the module 250 discussed below.

Figure 5C:
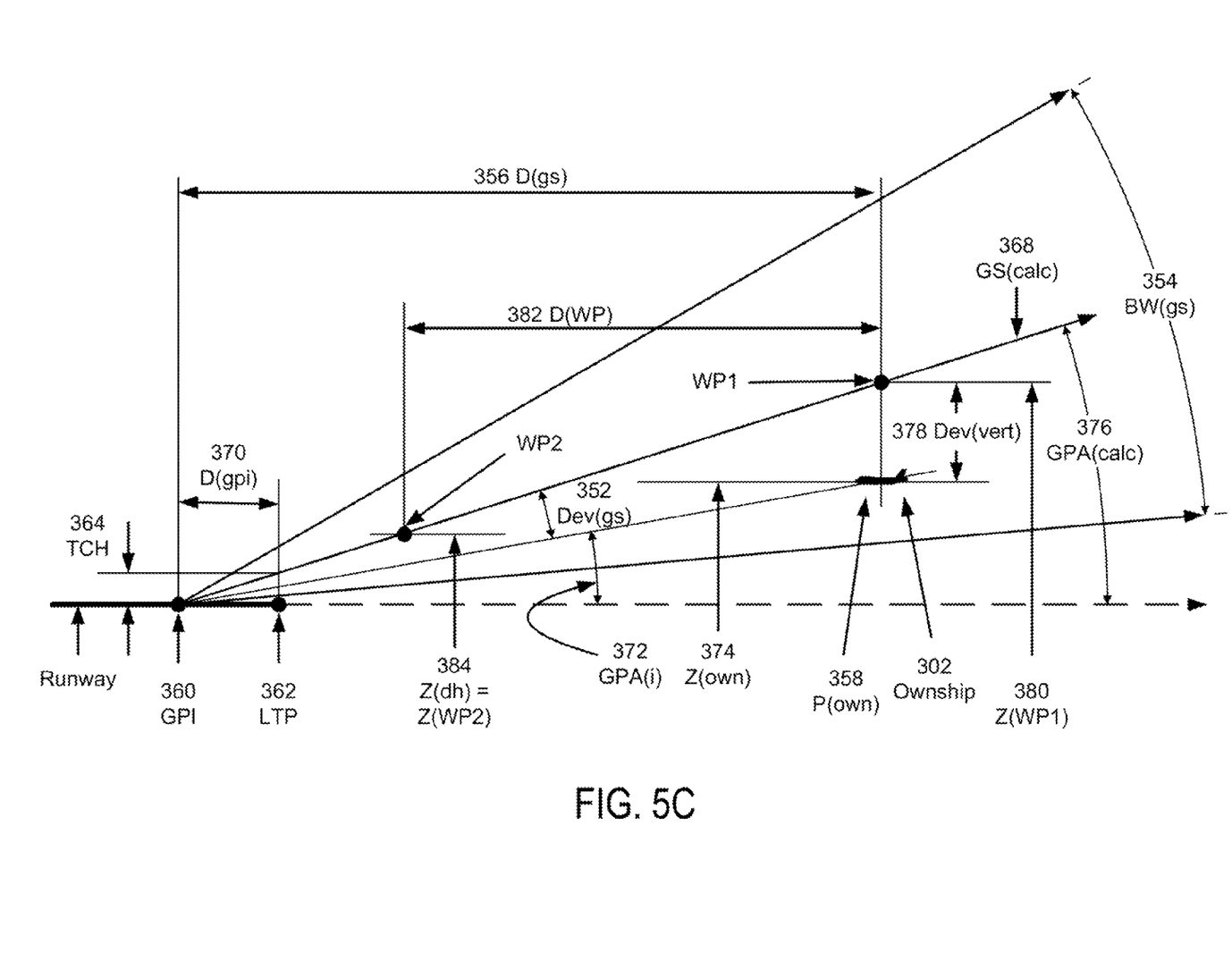

To initiate the second sequence of actions and referring to FIG. 5C, the flowchart proceeds from module 212 to module 230 with the determining of glide slope deviation angle Dev (gs) 352 of ownship 302 as a function of ILS measurement data and runway and ILS ground transmitters data. Using ILS deviation data representative of a glide slope measurement and glide slope beam width BW(loc) 354, Dev(gs) 352 may be determined.

The flowchart continues with module 232 with the determining of a distance D(gs) 356 between the P(own) 358 and the position of a ground point intercept GPI 360 as a function of navigation data and runway and ILS ground transmitters data. In one embodiment, GPI 360 could be represented by the latitude/longitude information of the glide slope transmitter. In another embodiment, GPI 360 may be determined from other runway and ILS ground transmitters data. In one example, GPI 360 may be determined from data representative of database information corresponding to the landing threshold position LTP 362, threshold crossing height TCH 364, glide path angle GPA (not shown) of the glide slope (not shown), and the direction of the runway. The distance D(gpi) 370 between the GPI 360 from the LTP 362 can be determined as the quotient of the TCH 336 divided by tangent of the GPA; then, the GPI 360 could be determined by applying D(gpi) 370 as an offset from the LTP 362 in the direction of the runway.

The flowchart continues with module 234 with the determining of an instantaneous glide path angle GPA(i) 372 as a function of P(own) 358, Z(own) 374, and the GPI 360. For example, GPA(i) 372 could be the tangent of a quotient, where the quotient is determined as the difference between Z(own) 374 and the elevation of the GPI divided by the difference of P(own) 358 and the position of the GPI 360.

The flowchart continues with module 236 with the determining of a calculated glide path angle GPA(calc) 376 as a sum of Dev(gs) 352 and GPA(i) 372.

The flowchart continues with module 238 with the determining of a vertical deviation Dev(vert) 378 between ownship 302 and the calculated glide slope GS(calc) 368 as a function of Dev(gs) 352, Z(own) 374, and GPA(calc) 376. For example, D(vert) 378 could be the difference between the product of the tangent of GPA(calc) 376 and D(gs) 356 and Z(own) 374.

The flowchart continues with module 240 with the determining of a altitude Z(WP1) 380 of WP1 as a function of Z(own) 374 and D(vert) 378. Z(WP1) 380 may be a point determined by the sum of Z(own) 374 and D(vert) 378.

The flowchart continues with module 242 with the determination of the distance D(WP) 382 of WP2 as a function of GPA(calc) 376, Z(WP1) 380, and the altitude Z(dh) 384 of the decision height (which is equal to the altitude Z(WP2) of WP2), where the decision height has been received as input from the navigation system. For example, D(WP) 382 could be the quotient of the difference between Z(WP1) 380 and Z(dh) 384 divided by the tangent of GPA(calc) 376. Then, the second sequence of actions ends and the flowchart proceeds to module 250.

The flowchart proceeds from module 228 or module 242 to module 250 with the determining of the position P(WP2) 390 of WP2 as a function of P(WP1) 318 and either the distance D(WP) 348 or D(WP) 382 determined in module 228 or module 242, respectively. That is, the position P(WP2) 390 of WP2 can be determined by the sum of P(WP1) 318 and either D(WP) 346 or D(WP) 382. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating a highway-in-the-sky ("HITS") image based on deviation information provided by an instrument landing system ("ILS"), such HITS image generating system comprising:
    a source of navigation data;
    a source of ILS deviation data;
    a source of navigation reference data;
    an image data generator configured to
        receive navigation data, ILS deviation data, and navigation reference data,
        determine instantaneous waypoint data as a function of the navigation data, the ILS deviation data, and the navigation reference data, where
            the instantaneous waypoint data is representative of a first instantaneous waypoint and a second instantaneous waypoint, and
        generate image data representative of a HITS, where
            a proximal end of the HITS is based upon the first instantaneous waypoint, and
            a distal end of the HITS is based upon the second instantaneous waypoint, and
        provide the image data to a display system; and
    the display system configured to
        receive the image data, and
        present the image represented in the image data on at least one display unit.

2. The system of claim 1, wherein
the image of the HITS is presented against the background of an image of a three-dimensional perspective indicative of the scene outside the aircraft, where
    the HITS provides a pilot visual guidance to a runway located within the scene.

3. The system of claim 2, wherein
the position of the distal end of the HITS in relation to the landing area of the runway as presented on the display unit provides a visual cue to the pilot of erroneous navigation data.

4. The system of claim 1, wherein
the first instantaneous waypoint is comprised of a first waypoint horizontal position and a first waypoint vertical position, where
    the first waypoint horizontal position is determined as a function of the navigation data, a first distance, and either a localizer deviation angle or the navigation reference data, where
        the first distance is a lateral distance between ownship and the localizer course and determined as a function of the localizer deviation angle and a second distance, where
            the second distance is a distance between ownship and the localizer transmitter and determined as a function of the navigation data and the navigation reference data, and
        the localizer deviation angle is determined as a function of the ILS deviation data and the navigation reference data, and
    the first waypoint vertical position is determined as a function of the navigation data and a third distance, where
        the third distance is the vertical distance between ownship and the glide slope and determined as a function of the navigation reference data, a glide slope deviation angle, and a fourth distance, where
            the fourth distance is the vertical distance between ownship and the glide slope transmitter, and
            the glide slope deviation angle is determined as a function of the ILS deviation data and the navigation reference data.

5. The system of claim 4, wherein
the second instantaneous waypoint is comprised of a second waypoint horizontal position and a second waypoint vertical position, where
    the second waypoint vertical position is determined as a function of the navigation data, and the second waypoint horizontal position is determined as a function of the navigation reference data, the first waypoint horizontal position, and a fifth distance, where
the fifth distance is determined as a function of the navigation reference data, the first waypoint vertical position, and the second waypoint vertical position.

6. The system of claim 1, wherein
the first instantaneous waypoint is comprised of a first waypoint horizontal position and a first waypoint vertical position, where
the first waypoint horizontal position is determined as a function of the navigation data, a first distance, and either a localizer deviation angle or the navigation reference data, where
the first distance is a lateral distance between ownship and the localizer course and determined as a function of the localizer deviation angle and a second distance, where
the second distance is a distance between ownship and the localizer transmitter and determined as a function of the navigation data and the navigation reference data, and
the localizer deviation angle is determined as a function of the ILS deviation data and the navigation reference data, and
the first waypoint vertical position is determined as a function of the navigation data and a third distance, where
the third distance is the vertical distance between ownship and a calculated glide slope and determined as a function of the navigation data, a glide slope deviation angle, and a calculated glide path angle, where
the calculated glide slope is determined as a function of the glide slope deviation angle and an instantaneous glide path angle,
the glide slope deviation angle is determined as a function of the ILS deviation data and the navigation reference data, and
the instantaneous glide path angle is determined as a function of the navigation data and the navigation reference data.

7. The system of claim 6, wherein
the second instantaneous waypoint is comprised of a second waypoint horizontal position and a second waypoint vertical position, where
the second waypoint vertical position is determined as a function of the navigation data, and
the second waypoint horizontal position is determined as a function of the navigation reference data, the first waypoint horizontal position, and a fifth distance, where
the fifth distance is determined as a function of the calculated glide slope, the first waypoint vertical position, and the second waypoint vertical position.

8. A device for generating a highway-in-the-sky ("HITS") image based on deviation information provided by an instrument landing system ("ILS"), such device comprising:
an image data generator configured to
receive navigation data, ILS deviation data, and navigation reference data;
determine instantaneous waypoint data as a function of the navigation data, the ILS deviation data, and the navigation reference data, where
the instantaneous waypoint data is representative of a first instantaneous waypoint and a second instantaneous waypoint;
generate image data representative of a HITS, where
a proximal end of the HITS is based upon the first instantaneous waypoint, and
a distal end of the HITS is based upon the second instantaneous waypoint; and
provide the image data to a display system, whereby an image represented in the image data is subsequently presented on at least one display unit.

9. The device of claim 8, wherein
the image of the HITS is presented against the background of an image of a three-dimensional perspective indicative of the scene outside the aircraft, where
the HITS provides a pilot visual guidance to a runway located within the scene.

10. The device of claim 9, wherein the position of the distal end of the HITS in relation to the landing area of the runway as presented on the display unit provides a visual cue to the pilot of erroneous navigation data.

11. The device of claim 8, wherein
the first instantaneous waypoint is comprised of a first waypoint horizontal position and a first waypoint vertical position, where
the first waypoint horizontal position is determined as a function of the navigation data, a first distance, and either a localizer deviation angle or the navigation reference data, where
the first distance is a lateral distance between ownship and the localizer course and determined as a function of the localizer deviation angle and a second distance, where
the second distance is a distance between ownship and the localizer transmitter and determined as a function of the navigation data and the navigation reference data, and
the localizer deviation angle is determined as a function of the ILS deviation data and the navigation reference data, and
the first waypoint vertical position is determined as a function of the navigation data and a third distance, where
the third distance is the vertical distance between ownship and the glide slope and determined as a function of the navigation reference data, a glide slope deviation angle, and a fourth distance, where
the fourth distance is the vertical distance between ownship and the glide slope transmitter, and
the glide slope deviation angle is determined as a function of the ILS deviation data and the navigation reference data.

12. The device of claim 11, wherein
the second instantaneous waypoint is comprised of a second waypoint horizontal position and a second waypoint vertical position, where
the second waypoint vertical position is determined as a function of the navigation data, and
the second waypoint horizontal position is determined as a function of the navigation reference data, the first waypoint horizontal position, and a fifth distance, where
the fifth distance is determined as a function of the navigation reference data, the first waypoint vertical position, and the second waypoint vertical position.

13. The device of claim 8, wherein
the first instantaneous waypoint is comprised of a first waypoint horizontal position and a first waypoint vertical position, where
the first waypoint horizontal position is determined as a function of the navigation data, a first distance, and either a localizer deviation angle or the navigation reference data, where
the first distance is a lateral distance between ownship and the localizer course and determined as a function of the localizer deviation angle and a second distance, where
the second distance is a distance between ownship and the localizer transmitter and determined as a function of the navigation data and the navigation reference data, and
the localizer deviation angle is determined as a function of the ILS deviation data and the navigation reference data, and
the first waypoint vertical position is determined as a function of the navigation data and a third distance, where
the third distance is the vertical distance between ownship and a calculated glide slope and determined as a function of the navigation data, a glide slope deviation angle, and a calculated glide path angle, where
the calculated glide slope is determined as a function of the glide slope deviation angle and an instantaneous glide path angle,
the glide slope deviation angle is determined as a function of the ILS deviation data and the navigation reference data, and
the instantaneous glide path angle is determined as a function of the navigation data and the navigation reference data.

14. The device of claim 13, wherein
the second instantaneous waypoint is comprised of a second waypoint horizontal position and a second waypoint vertical position, where
the second waypoint vertical position is determined as a function of the navigation data, and
the second waypoint horizontal position is determined as a function of the navigation reference data, the first waypoint horizontal position, and a fifth distance, where
the fifth distance is determined as a function of the calculated glide slope, the first waypoint vertical position, and the second waypoint vertical position.

15. A method for generating a highway-in-the-sky ("HITS") image based on deviation information provided by an instrument landing system ("ILS"), such method comprising:
receiving navigation data from a navigation data source,
receiving ILS deviation data from an ILS deviation data source,
receiving navigation reference data from a navigation reference data source,
determining instantaneous waypoint data as a function of the navigation data, the ILS deviation data, and the navigation reference data, where
the instantaneous waypoint data is representative of a first instantaneous waypoint and a second instantaneous waypoint;
generating image data representative of a HITS, where
a proximal end of the HITS is based upon the first instantaneous waypoint, and
a distal end of the HITS is based upon the second instantaneous waypoint; and
providing the image data to a display system, whereby an image represented in the image data is subsequently presented on at least one display unit.

16. The method of claim 15, wherein
the image of the HITS is presented against the background of an image of a three-dimensional perspective indicative of the scene outside the aircraft, where
the HITS provides a pilot visual guidance to a runway located within the scene.

17. The method of claim 16, wherein the position of the distal end of the HITS in relation to the landing area of the runway as presented on the display unit provides a visual cue to the pilot of erroneous navigation data.

18. The method of claim 15, wherein
the first instantaneous waypoint is comprised of a first waypoint horizontal position and a first waypoint vertical position, where
the first waypoint horizontal position is determined as a function of the navigation data, a first distance, and either a localizer deviation angle or the navigation reference data, where
the first distance is a lateral distance between ownship and the localizer course and determined as a function of the localizer deviation angle and a second distance, where
the second distance is a distance between ownship and the localizer transmitter and determined as a function of the navigation data and the navigation reference data, and
the localizer deviation angle is determined as a function of the ILS deviation data and the navigation reference data, and
the first waypoint vertical position is determined as a function of the navigation data and a third distance, where
the third distance is the vertical distance between ownship and the glide slope and determined as a function of the navigation reference data, a glide slope deviation angle, and a fourth distance, where
the fourth distance is the vertical distance between ownship and the glide slope transmitter, and
the glide slope deviation angle is determined as a function of the ILS deviation data and the navigation reference data.

19. The method of claim 18, wherein
the second instantaneous waypoint is comprised of a second waypoint horizontal position and a second waypoint vertical position, where
the second waypoint vertical position is determined as a function of the navigation data, and
the second waypoint horizontal position is determined as a function of the navigation reference data, the first waypoint horizontal position, and a fifth distance, where
the fifth distance is determined as a function of the navigation reference data, the first waypoint vertical position, and the second waypoint vertical position.

20. The method of claim 15, wherein
the first instantaneous waypoint is comprised of a first waypoint horizontal position and a first waypoint vertical position, where the first waypoint horizontal position is determined as a function of the navigation data, a first distance, and either a localizer deviation angle or the navigation reference data, where
  the first distance is a lateral distance between ownship and the localizer course and determined as a function of the localizer deviation angle and a second distance, where
    the second distance is a distance between ownship and the localizer transmitter and determined as a function of the navigation data and the navigation reference data, and
  the localizer deviation angle is determined as a function of the ILS deviation data and the navigation reference data, and
the first waypoint vertical position is determined as a function of the navigation data and a third distance, where
  the third distance is the vertical distance between ownship and a calculated glide slope and determined as a function of the navigation data, a glide slope deviation angle, and a calculated glide path angle, where
    the calculated glide slope is determined as a function of the glide slope deviation angle and an instantaneous glide path angle,
    the glide slope deviation angle is determined as a function of the ILS deviation data and the navigation reference data, and
    the instantaneous glide path angle is determined as a function of the navigation data and the navigation reference data.

21. The method of claim 20, wherein
the second instantaneous waypoint is comprised of a second waypoint horizontal position and a second waypoint vertical position, where
  the second waypoint vertical position is determined as a function of the navigation data, and
  the second waypoint horizontal position is determined as a function of the navigation reference data, the first waypoint horizontal position, and a fifth distance, where
    the fifth distance is determined as a function of the calculated glide slope, the first waypoint vertical position, and the second waypoint vertical position.

\* \* \* \* \*